Patented May 3, 1938

2,115,960

UNITED STATES PATENT OFFICE 2,115,960

METHOD OF TREATING MINERAL OILS

Hans Friedrich Lindeke, Martinez, Calif., assignor to Shell Development Company, San Francisco, Calif., a corporation of Delaware No Drawing. Application April 2, 1934,
Serial No. 718,680

11 Claims. (Cl. 196—13)

This invention pertains to the art of separating various mixtures or solutions into their components by extraction methods and is more particularly directed to an improvement in extracting methods used in refining mineral oils. Among such oils, various petroleum products are often subjected to extraction treatments. For example, lubricating or similar relatively heavy oils are refined by extraction methods to improve their lubricating properties as well as to obtain oils which are stable against deterioration, for example, under oxidizing conditions. Lighter oils, like stove oils, kerosenes or naphthas, are often refined by extraction to produce commercial products, while similar extraction methods are also used for separating aromatic portions of gasolines from the less aromatic portions.

It is known that the efficiency of an extraction process depends in a great measure upon the selectivity of the solvent used, i. e. its property to dissolve certain types of components from the material being extracted without dissolving substantial quantities of other different types of components, and also upon its solvent power, i. e. its property not only to dissolve selectively but also to dissolve from such a material substantial quantities of the more soluble components at operating temperatures.

The materials which are subjected to extraction treatments usually are more or less complex mixtures of numerous components differing from each other either in physical or chemical properties or in both. For example, petroleum oils, such as lubricating oil distillates or residues, are composed of a very large number of various hydrocarbons and some of them contain certain hydrocarbon derivatives. Such component substances vary in their molecular sizes, molecular weights, molecular structures, and chemical properties, each substance possessing solubility characteristics towards a certain solvent different from the corresponding characteristics of other substances. When such a mixture, or solution, of substances is brought in contact with a solvent under extracting conditions, a heterogeneous mixture is produced which, upon reaching equilibrium, is usually found to consist of two phases: one relatively rich in solvent and containing mostly substances preferably soluble therein, and the other relatively poor in solvent and containing mostly substances which are less soluble in the solvent.

It is a rather generally accepted understanding of the process of extracting mineral oils with selective solvents that the oil components segregated in the two separated portions (the extract and the raffinate) differ one from the other principally in their chemical characteristics; the portion which is preferably dissolved in the selective solvent during the process of extraction, has become usually known as the naphthenic portion, composed mainly of groups of substances such as aromatics, unsaturates, and naphthenes, or, generally, hydrocarbons with relatively low hydrogen-carbon ratio, as well as asphaltenes and sulfur and nitrogen compounds, when these are present in the oil being extracted; the other portion of the oil, which is less soluble in the solvent, is usually referred to as the paraffinic portion of the oil and is a concentrate of hydrocarbons with relatively high hydrogen-carbon ratio, is relatively low in aromatics, has lower refractive index than the extract, etc.

It has been understood that the sharpness of separation of one portion of the oil (naphthenic) from the other (paraffinic), that is the segregation or extraction of polarizable compounds, such as aromatics, asphaltenes, etc., without contaminating the extract with non- or less-polarizable compounds, such as paraffins, naphthenes, and other saturated hydrocarbons, and vice versa, is greatly impeded by the mutual solubility of these oil components. To overcome this drawback, i. e. to counteract to some extent the effect of the mutual solubility of the various groups of oil components, which precludes a sharp separation of some of these groups from the others, various improvements were devised in extraction processes, such as countercurrent methods of extraction, and a large number of solvents were found which accomplish such separation with an apparently fair degree of sharpness.

I have observed, however that, as a general rule, there exists an obstacle in the way of sharp separation by extraction of oil components of one chemical type from the oil components of a different type, which cannot be satisfactorily overcome by known methods of extraction. The cause of the difficulty, it was found, resides in the fact that the solubility of oil components in various solvents depends not only on their chemical nature, but is also very markedly effected by the size of their molecules. For example, a petroleum fraction may consist substantially of paraffinic and aromatic hydrocarbons boiling within a range of, say, 200° C. These hydrocarbons are more or less uniformly distributed throughout the whole boiling range. When such a fraction is extracted with a selective solvent, either by a single-contact batch method or by a countercurrent method, it becomes separated into a raffinate and an extract, the former having a lower specific gravity, a lower viscosity and usually a lower boiling range, than the extract. The difference in these properties apparently indicates the extent of the desired separation of oil into two chemically different portions. However, by a more careful study of such products of extraction, I have discovered that both the raffinate and the extract usually contain components of opposite groups (aromatic and paraffinic hydrocarbons, respectively), and that the contamination of the extract is due to the relatively excessive solubility of some of the small paraffinic molecules in the solvent, while the raffinate is found to contain some of the relatively large aromatic molecules. This particular manner of misdistribution of certain components is usually entirely obscured due to their relatively low concentrations in the separated portions of the extracted oils, and its effects are often misinterpreted and merely ascribed to the insufficient selectivity of the solvent.

The present invention provides a remedy for the above described undesirable feature accompanying extraction of oils with selective solvents and permits a sharper separation of oils into portions having distinctly different chemical properties, such as, for example, refractive or viscosity indexes, hydrogen-carbon ratios, etc., whereby maximum yields of products having desired qualities can be obtained.

Briefly, the process of the present invention consists in separating a mineral oil by fractional distillation into two or more fractions boiling within relatively narrow boiling ranges not over 75° C. and preferably 30° C. or less, at a pressure of not over 1 mm. mercury, thereby segregating molecules of approximately the same size, extracting each fraction separately by a method suitable for each fraction, and thereafter combining all or some of the resulting raffinates and/or extracts into desired products. It is also within the present invention to combine two or more of very short fractions, into a group of composite fractions boiling within above indicated ranges and to extract separately one or more of the composite fractions with a selective solvent. The oil raffinates or extracts may be physically or chemically refined before being combined.

For example, a crude oil heavy distillate (of a lubricating oil viscosity range) or residue may be separated by distillation, preferably under vacuum, into three fractions, each boiling substantially within successive 50° C. ranges at a pressure of about 1 mm. of mercury, and a residue, which may boil within a wider range. In accordance with this invention, either some or, preferably, all of these fractions should be subjected to extraction under suitable conditions of temperature, pressure, concentration and composition of solvent, etc. with a selective solvent, whereby undesirable oil components are removed from the treated fractions; the remaining refined portions of these fractions are then used for compounding the desired lubricating oil.

In addition to these essential steps it is often highly beneficial to apply a pretreatment hereafter described to the crude material before separating it into a series of fractions, or subject to it some or all fractions produced from the crude by fractional distillation or condensation. This pretreatment consists in removing from the crude its asphaltic components preferably by diluting the oil with such precipitants or oil-diluents, as low-boiling hydrocarbons of gasoline and kerosene type, or liquefied propane, butanes, pentanes, hexanes, etc., or their mixtures. Upon dilution of the crude oil with one of these liquids, the asphalt precipitates in the form of sludge and is separated from the deasphaltized oil-diluent solution. The diluent may be removed, if desired, from the deasphaltized oil, and the deasphaltized oil may be fractionated then, as described, prior to the extraction treatment.

Many oils contain besides asphaltic components also waxy components, which may remain substantially unaffected by the deasphaltizing treatment; in these cases it is preferable to dewax the deasphaltized oil, for example, by chilling its solution in the diluent to a sufficiently low temperature to cause the separation of wax and then filter the precipitated wax out of the oil to be fractionated. The chilling may be effected as is well known either by an external cooling means or by adiabatic evaporation of the volatile diluent.

Furthermore, it is within the scope of this invention to subject the products of the fractional extraction (i. e. the raffinates or extracts obtained by extraction of narrow-boiling or short fractions) to a refining treatment, such as a sulfuric acid treatment, or clay or alkali treatments, prior to combining such products.

It is evident from the foregoing that the efficiency of the new process is determined by the number of fractions into which the original oil is divided for extraction and by the sharpness with which the oil is fractionated, so that the less the overlap of boiling ranges of the adjacent fractions and the greater the number of fractions, the greater will be the yield of the composite raffinate and the composite extract, and the greater will be the difference in their chemical and physical properties, as compared to the raffinate and extract which would be obtained by extraction of the original oil as a whole with the same solvent. It is to be understood, that by the boiling ranges of fractions are meant the temperature ranges within which the major portion of a fraction can be distilled at a pressure suitable to prevent cracking. Such a range may be represented by the temperature difference between the 10% and 90% distillation points. It is a common practice to distill mineral oils of a lubricating type under vacuum, i. e. at pressures below atmospheric, so that the above specified boiling ranges of lubricating oil fractions to be extracted should usually correspond to pressures of the order 25 mm. of mercury or lower, e. g. 10 mm.—1 mm. or even a fraction of 1 mm., at which pressures the cracking of such fractions is substantially avoided.

A further advantage of the new process is that it allows selection of optimum extracting conditions, such as temperature, solvent, concentrations of solvents, etc., for each fraction, and therefore is more flexible for obtaining products meeting various specifications, than the conventional method of extracting in bulk.

The number of fractions into which the oil to be extracted should be divided by distillation, and the specific boiling ranges of these fractions depend upon the properties of the components of the oil used and the qualities desired in the final product. They should be best determined by experiments carried out on a small scale in each particular case.

Some of the selective solvents suitable for extracting mineral oil fractions for the purpose of producing paraffinic oils are the following: liquid $SO_2$, furfural, chlorex, pyridine, pyridine homologues, like picolines and others, and analogues, like quinoline, and quinoline homologues, phenols, cresols, etc., organic cyanates, organic thiocyanates, organic nitro compounds, various alcohols, aldehydes and ketones, organic amines, and others. Such solvents may be used either singly or combined in groups of two or more, like chlorex-pyridine, or liquid $SO_2$-furfural, and, if desired, in the presence of a diluent, such as benzol, toluol, or other aromatic hydrocarbons, or aromatic extracts of gasoline, of kerosene or of light naphthas. While either batch or continuous methods of extraction may be used, I prefer, particularly when an aromatic diluent is used, to employ a countercurrent method of extraction, wherein the oil stream (either undiluted, or diluted with a paraffinic diluent) is passed countercurrently to and in contact with a selective solvent, which may be either a single or mixed solvent; as stated above, the selective solvent may be diluted with an aromatic diluent prior to its contact with the oil.

*Example*

A deasphaltized and dewaxed crude oil residue from a distillation unit, having a boiling range of approximately 275°–350° C. under 10 mm. absolute pressure was extracted with furfural, producing the following raffinate:

| | |
|---|---|
| Yield_____per cent__ | 15.2 |
| Viscosity S. U. at 100° F_____ | 1790 |
| Viscosity S. U. at 210° F_____ | 113 |
| Viscosity index_____ | 83 |

Another sample of the same residue was divided by fractional distillation into 3 fractions, a first fraction of about 34% having a boiling range of approximately 275°–305° C., a second fraction of about 27% boiling between 305° C. and 320° C., and a third fraction of 38% boiling between 320° C. and 350° C., all under 10 mm. absolute pressure. These three fractions were separately extracted with furfural and the raffinates blended together, yielding a final product of the following properties:

| | |
|---|---|
| Yield_____per cent__ | 36.8 |
| Viscosity S. U. at 100° F_____ | 587 |
| Viscosity S. U. at 210° F_____ | 66 |
| Viscosity index_____ | 88 |

This example clearly indicates the improvement in the yield and quality of the refined product obtained by the new method over a conventional method of extraction. The process has been found particularly effective for refining lubricating oils which were first freed of asphaltic substances and dewaxed.

It is to be understood, that the separation of a mineral oil into fractions, each of which consists of molecules having approximately the same size, as characterized by the narrow boiling ranges of such fractions, can be accomplished not only by fractional distillation, but also by fractional extraction of the oil with a suitable solvent, such for example, as liquid carbon dioxide.

I claim as my invention:

1. In the process of refining a mineral lubricating oil the steps of fractionating the oil by distillation into fractions having narrower boiling ranges, extracting all or part of these fractions with a preferential solvent thereby producing a series of narrow boiling raffinates and extracts, and combining all or part of the raffinates to a composite raffinate which constitutes a larger part of the original fraction than is obtained by extraction of the original oil in one treatment to a similar product.

2. In a process of refining a mineral lubricating oil the steps of fractionating the oil by distillation into fractions having narrower boiling ranges of not over about 75° C., extracting all or part of these fractions with a preferential solvent thereby producing a series of narrow boiling raffinates and extracts, and combining all or part of the raffinates to a composite raffinate which constitutes a larger part of the original fraction than is obtained by extraction of a composite of the fractions of narrower boiling ranges forming sources of the combined raffinates.

3. A process for improving the yield of a desired refined product from a mineral lubricating oil fraction of a relatively wide boiling range approximately equal to the boiling range of the desired product comprising the steps of fractionating the oil by distillation into fractions having narrower boiling ranges, extracting these fractions with a preferential solvent thereby producing a series of narrow boiling raffinates and extracts, and combining the raffinates to a composite raffinate which constitutes a larger part of the original fraction than is obtained by extraction of the original oil in one treatment to a similar product.

4. A process for improving the yield of a desired refined product from a mineral lubricating oil fraction of a relatively wide boiling range approximately equal to the boiling range of the desired product comprising the steps of fractionating the oil by distillation into fractions having narrower boiling ranges of about 75° C., extracting these fractions with a preferential solvent for non-paraffinic hydrocarbons thereby producing a series of narrow boiling raffinates and extracts, and combining the raffinates to a composite raffinate in a yield which is substantially greater than is obtained by extracting the unfractionated mineral oil for a raffinate of similar paraffinicity.

5. In the process of refining a mineral lubricating oil fraction the steps of fractionating the oil to separate it into a plurality of cuts of narrow boiling ranges, extracting some of these cuts with a preferential solvent, thereby producing a series of narrow boiling raffinates and extracts, and combining some of the raffinates to a composite raffinate which constitutes a larger part of the original oil fraction than is obtained by extraction of a composite of the cuts forming sources of the combined raffinates in one treatment to a similar product.

6. In the process of refining a mineral lubricating oil fraction the steps of fractionating the oil with a solvent selective chiefly as to molecular size, to separate it into a plurality of cuts of narrower boiling ranges, extracting some of these cuts with a solvent selective chiefly as to molecular type, thereby producing a series of narrow boiling raffinates and extracts, and combining some of the raffinates to a composite raffinate which constitutes a larger part of the original oil fraction than is obtained by extraction of a composite of the cuts forming sources of the combined raffinates in one treatment to a similar product.

7. In the process of refining a mineral lubricating oil fraction the steps of fractionating the oil by vacuum distillation to separate it into a plurality of cuts of narrow boiling ranges, extracting some of these cuts with a preferential solvent, thereby producing a series of narrow boiling raffinates and extracts, and combining some of the raffinates to a composite raffinate which constitutes a larger part of the original oil fraction than is obtained by extraction of a composite of the cuts forming sources of the combined raffinates in one treatment to a similar product.

8. In the process of separating an initial mixture of components belonging to different chemical groups, each chemical group containing components of different molecular sizes, said chemical groups being characterized by different solubilities in a preferential solvent, into two portions, one of which is a concentrate of components of the group preferentially soluble in the said solvent, and the other is a concentrate of components of the other group, the steps of fractionating the mixture to separate it into a plurality of cuts of narrower boiling ranges, extracting some of these cuts with a preferential solvent for one of said chemical groups to produce a series of narrow boiling raffinates and extracts, and blending at least two corresponding extraction products to produce a composite product which constitutes a greater part of the initial mixture than is obtained by the extraction of a composite of the cuts forming the sources of the blended extraction products in one treatment to a similar product.

9. In the process of separating an initial mixture of components belonging to different chemical groups, each chemical group containing components of different molecular sizes, said chemical groups being characterized by different solubilities in a preferential solvent, into two portions, one of which is a concentrate of components of the group preferentially soluble in the said solvent, and the other is a concentrate of components of the other group, the steps of fractionating the mixture by distillation to separate it into a plurality of cuts of narrower boiling ranges, extracting some of these cuts with a preferential solvent for one of said chemical groups to produce a series of narrow boiling raffinates and extracts, and blending at least two raffinates to produce a composite raffinate which constitutes a greater part of the initial mixture than is obtained by the extraction of a composite of the cuts forming the sources of the blended extraction products in one treatment to a similar product.

10. In the process of separating an initial mixture of components belonging to different chemical groups, each chemical group containing components of different molecular sizes, said chemical groups being characterized by different solubilities in a preferential solvent, into two portions, one of which is a concentrate of components of the group preferentially soluble in the said solvent, and the other is a concentrate of components of the other group, the steps of fractionating the mixture by vacuum distillation to separate it into a plurality of cuts of narrower boiling ranges, extracting some of these cuts with a preferential solvent for one of said chemical groups to produce a series of narrow boiling raffinates and extracts, and blending at least two corresponding extraction products to produce a composite product which constitutes a greater part of the initial mixture than is obtained by the extraction of a composite of the cuts forming the sources of the blended extraction products in one treatment to a similar product.

11. In the process of separating an initial mixture of components belonging to different chemical groups, each chemical group containing components of different molecular sizes, said chemical groups being characterized by different solubilities in a preferential solvent, into two portions, one of which is a concentrate of components of the group preferentially soluble in the said solvent, and the other is a concentrate of components of the other group, the steps of fractionating the mixture to separate it into a plurality of cuts of narrower boiling ranges, extracting a pair of the adjacent cuts with a preferential solvent for one of said chemical groups to produce a series of narrow boiling raffinates and extracts, and blending a pair of corresponding extraction products derived from adjacent cuts to a composite product which constitutes a larger part of the initial mixture than is obtained by extraction of a composite of said adjacent cuts forming sources of the blended extraction products in one treatment to a similar product.

HANS FRIEDRICH LINDEKE.

DISCLAIMER 2,115,960.—*Hans Friedrich Lindeke*, Martinez, Calif. METHOD OF TREATING MINERAL OILS. Patent dated May 3, 1938. Disclaimer filed March 25, 1940, by the assignee, *Shell Development Company*.

Hereby enters this disclaimer to claims 1, 2, 3, 4, 5, and 9 of said Letters Patent, and hereby disclaims from the scope of claims 8 and 11 all processes for separating mixtures in which the mixture is not fractionated to separate it into a plurality of cuts of narrower boiling ranges with a solvent selective chiefly as to molecular size.

(This disclaimer correcting error as to matter disclaimed supersedes disclaimer published in O. G. April 16, 1940.)